United States Patent
Yang et al.

(10) Patent No.: US 8,861,923 B2
(45) Date of Patent: Oct. 14, 2014

(54) METHOD, SYSTEM AND APPARATUS FOR CONTROLLING MULTIMEDIA PLAYING THROUGH VIA BLUETOOTH

(75) Inventors: Xin Yang, Shenzhen (CN); Zhiping Zhang, Shenzhen (CN); Qihong Fu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 17 days.

(21) Appl. No.: 13/510,997

(22) PCT Filed: May 25, 2010

(86) PCT No.: PCT/CN2010/073221
§ 371 (c)(1),
(2), (4) Date: May 21, 2012

(87) PCT Pub. No.: WO2010/148883
PCT Pub. Date: Dec. 29, 2010

(65) Prior Publication Data
US 2012/0288255 A1    Nov. 15, 2012

(30) Foreign Application Priority Data
Dec. 17, 2009    (CN) .......................... 2009 1 0252487

(51) Int. Cl.
*H04N 5/765*    (2006.01)
*H04N 5/931*    (2006.01)

(52) U.S. Cl.
USPC ........................................ 386/200; 386/204

(58) Field of Classification Search
None
See application file for complete search history.

(56) References Cited

U.S. PATENT DOCUMENTS

| 7,352,732 B2 * | 4/2008 | Sata et al. ...................... 370/338 |
| 8,131,646 B2 * | 3/2012 | Kocher et al. .................. 705/54 |
| 2008/0020703 A1 | 1/2008 | Harshaw |
| 2009/0149128 A1 | 6/2009 | Tomoda |

FOREIGN PATENT DOCUMENTS

| CN | 101488783 A | 7/2009 |
| CN | 101763875 A | 6/2010 |
| EP | 2110796 A2 | 10/2009 |
| WO | 2008027744 A2 | 3/2008 |

OTHER PUBLICATIONS

International Search Report for PCT/CN2010/073221 dated Aug. 17, 2010.

* cited by examiner

*Primary Examiner* — William C Vaughn, Jr.
*Assistant Examiner* — Oluwaseun A Adegeye
(74) *Attorney, Agent, or Firm* — Ling Wu; Stephen Yang; Ling and Yang Intellectual Property

(57) ABSTRACT

A system and method for controlling subtitle switching through Bluetooth are provided. The method includes the following steps: a Bluetooth control device transmits a media control instruction which instructs a Bluetooth multimedia playing device to perform subtitle switching to the Bluetooth multimedia playing device after a Bluetooth connection is established between the Bluetooth control device and the Bluetooth multimedia playing device; the Bluetooth multimedia playing device performs the subtitle switching after receiving the media control instruction, and after switching successfully, it loads the subtitle file which is obtained through switching and plays after combined with a video stream. By adopting the technical scheme of the present invention, it can realize wirelessly and remotely controlling a multimedia player through Bluetooth to load subtitle files freely and switch between a plurality of subtitle files when playing a multimedia video file.

7 Claims, 2 Drawing Sheets

METHOD, SYSTEM AND APPARATUS FOR CONTROLLING MULTIMEDIA PLAYING THROUGH VIA BLUETOOTH

TECHNICAL FIELD

The present invention relates to the field of Bluetooth wireless communication and multimedia video playing, and in particular, to a method, system and apparatus for controlling multimedia playing through Bluetooth.

BACKGROUND OF THE RELATED ART

The Bluetooth technology is an open standard of the wireless data and voice transmission, which mainly solves the wireless communication problem within short distance, and the effective communication distance is generally within 10 meters. The Bluetooth protocol standard is formulated and released by the SIG organization.

According to the different applications of the Bluetooth, the standard defines different application framework profiles. Wherein, in order to watch video on the Bluetooth media output device, it defines the video distribution profile (VDP); in order to realize the control function conveniently through the Bluetooth control device as well when listening to the stereosound music or watching the video media on the Bluetooth media output device, it stipulates the audiovideo remote control profile (AVRCP).

In a section of AVRCP 1.4, "4.5 Categories", it defines the common media playing control command, for example: play, stop, pause, forward, backward, etc. The video file will often carry with the subtitle while playing, and may provide a plurality of subtitle files in different languages, and these subtitle files can be loaded through the media player and displayed on the output interface of the media player synchronously with the audiovideo, but the AVRCP does not stipulate the operation command word (operation_id) corresponding to switching different subtitles, so that the strong extension control function which the multimedia player itself possesses is unable to be completed through the Bluetooth control device.

SUMMARY OF THE INVENTION

The technical problem to be solved by the present invention is to provide a method, system and apparatus for controlling subtitle switching through Bluetooth, which can realize wirelessly and remotely controlling a multimedia player to perform the subtitle switching through Bluetooth.

In order to solve the above-mentioned problem, the present invention provides a method for controlling subtitle switching through Bluetooth, comprising: a Bluetooth control device transmitting a media control instruction which instructs a Bluetooth multimedia playing device to perform subtitle switching to the Bluetooth multimedia playing device after a Bluetooth connection is established between the Bluetooth control device and the Bluetooth multimedia playing device, and the Bluetooth multimedia playing device performing the subtitle switching after receiving the media control instruction, and after switching successfully, loading a subtitle file which is obtained through switching, and playing after combined with a video stream.

The step of the Bluetooth control device transmitting a media control instruction which instructs a Bluetooth multimedia playing device to perform subtitle switching to the Bluetooth multimedia playing device comprises: setting a value of a reserved field therein as switching subtitle when the Bluetooth control device transmits a pass-through forwarding message to the Bluetooth multimedia playing device.

The reserved field is Vendor_unique_id.

After the step of the Bluetooth multimedia playing device performing the subtitle switching, the method further comprises: if switching succeeds, then transmitting a message of switching success to the Bluetooth control device, and if switching fails, then transmitting a message of switching failure to the Bluetooth control device.

The present invention also provides a system for controlling multimedia playing through Bluetooth, comprising a Bluetooth control device and a Bluetooth multimedia playing device, wherein, the Bluetooth control device comprises a Bluetooth control module, configured to: transmit a media control instruction which instructs the Bluetooth multimedia playing device to perform subtitle switching to the Bluetooth multimedia playing device after a Bluetooth connection is established between the Bluetooth control device and the Bluetooth multimedia playing device;

the Bluetooth multimedia playing device comprises a Bluetooth controlled module, a multimedia playing and controlling module and a multimedia playing output and display module;

the Bluetooth controlled module is configured to: control the multimedia playing and controlling module to perform the subtitle switching after receiving the media control instruction;

the multimedia playing and controlling module is configured to: perform the subtitle switching and load a switched subtitle file and transmit to the multimedia playing output and display module after combined with a video stream; and the multimedia playing output and display module is configured to: play the received video stream.

The Bluetooth control module is configured to transmit the media control instruction which instructs the Bluetooth multimedia playing device to perform the subtitle switching to the Bluetooth multimedia playing device through the following way: setting a value of a reserved field therein as switching subtitle when transmitting a pass-through forwarding message to the Bluetooth multimedia playing device.

The reserved field of the Bluetooth control device is Vendor_unique_id.

The Bluetooth controlled module is further configured to: perform analyzing after receiving the pass-through forwarding message, and acquire that the subtitle switching needs to be performed according to the value of the reserved field.

The Bluetooth controlled module is configured to control the multimedia playing and controlling module to perform the subtitle switching by the following way: transmitting a message of switching subtitle to the multimedia playing and controlling module or performing the subtitle switching by directly calling an application programming interface function of the multimedia playing and controlling module.

The multimedia playing and controlling module is further configured to: transmit a message of operation success to the Bluetooth control device after a switching subtitle operation is successful; and transmit a message of operation failure to the Bluetooth control device after the switching subtitle operation fails.

The present invention also provides a Bluetooth control device, comprising a Bluetooth control module, configured to:

transmit a media control instruction which instructs a Bluetooth multimedia playing device to perform subtitle switching to the Bluetooth multimedia playing device after a Bluetooth connection is established between the Bluetooth control device and the Bluetooth multimedia playing device.

The Bluetooth control module is configured to transmit the media control instruction which instructs the Bluetooth multimedia playing device to perform the subtitle switching to the Bluetooth multimedia playing device through the following way: setting a value of a reserved field therein as switching subtitle when transmitting a pass-through forwarding message to the Bluetooth multimedia playing device.

The reserved field is Vendor_unique_id.

In conclusion, the present invention provides a method, system and apparatus for controlling multimedia playing through Bluetooth, which can realize wirelessly and remotely controlling a multimedia player through Bluetooth to load the subtitle files freely and switch between a plurality of subtitle files when playing a multimedia video file.

PREFERRED EMBODIMENTS OF THE PRESENT INVENTION

In order to solve the above-mentioned problem, the present invention provides a Bluetooth control device, which is based on the protocol standard and extends the customized field of the manufacturer reserved by the protocol, so that the Bluetooth control device is able to transmit the SwitchSub signaling extended from the protocol frame to the multimedia playing device with the AVRCP function and the multimedia player is controlled wirelessly and remotely through the Bluetooth, which realizes loading the subtitle files freely and switching between a plurality of subtitle files when playing the multimedia video file.

Figure 1:
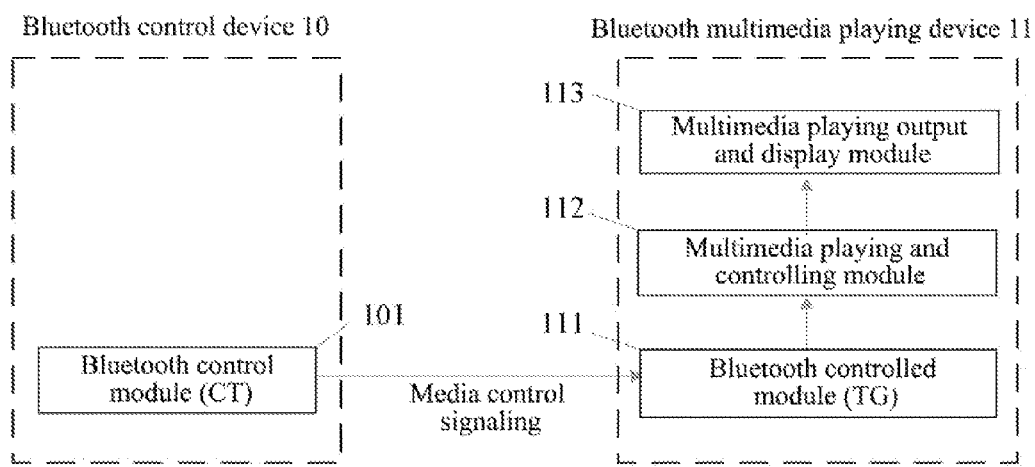
FIG. 1 is a structure schematic diagram according to a system embodiment of the present invention.

The present embodiment provides a system for controlling subtitle switching through Bluetooth. As shown in FIG. 1, the system includes a Bluetooth control device 10 and a Bluetooth multimedia playing device 11, wherein, the Bluetooth control device 10 includes a Bluetooth control module (CT) 101;

the Bluetooth multimedia playing device 11 includes a Bluetooth controlled module 111, a multimedia playing and controlling module 112 and a multimedia playing output and display module 113;

the Bluetooth control module is configured to transmit a media control instruction which instructs the Bluetooth multimedia playing device to perform subtitle switching to the Bluetooth multimedia playing device 11 after a Bluetooth connection is established between the Bluetooth control device 10 and the Bluetooth multimedia playing device 11;

the Bluetooth controlled module 111 is configured to control the multimedia playing and controlling module 112 to perform the subtitle switching after receiving the media control instruction the multimedia playing and controlling module 112 is configured to perform the subtitle switching and load a switched subtitle file and transmit to the multimedia playing output and display module 113 after combined with a video stream; and the multimedia playing output and display module 113 is configured to: play the received video stream.

The Bluetooth control module 101 transmitting the media control instruction which instructs the Bluetooth multimedia playing device 11 to perform the subtitle switching to the Bluetooth multimedia playing device 11 refers that: the Bluetooth control module 101 sets a value of a reserved field therein as switching subtitle when transmitting a pass-through forwarding message to the Bluetooth multimedia playing device 11.

The reserved field of the Bluetooth control device 10 is Vendor_unique_id.

The Bluetooth controlled module 111 performs analyzing after receiving the pass-through forwarding message, and acquire that the subtitle switching needs to be performed according to the value of the reserved field.

The Bluetooth controlled module 111 controlling the multimedia playing and controlling module 112 to perform the subtitle switching refers that: the Bluetooth controlled module 111 transmits a message of switching subtitle to the multimedia playing and controlling module 112 or performing the subtitle switching by directly calling the API function of the multimedia playing and controlling module 112.

The multimedia playing and controlling module 112 is further configured to transmit a message of operation success to the Bluetooth control device 10 after the switching subtitle operation is successful; and transmit a message of operation failure to the Bluetooth control device 10 after the switching subtitle operation fails.

Figure 2:
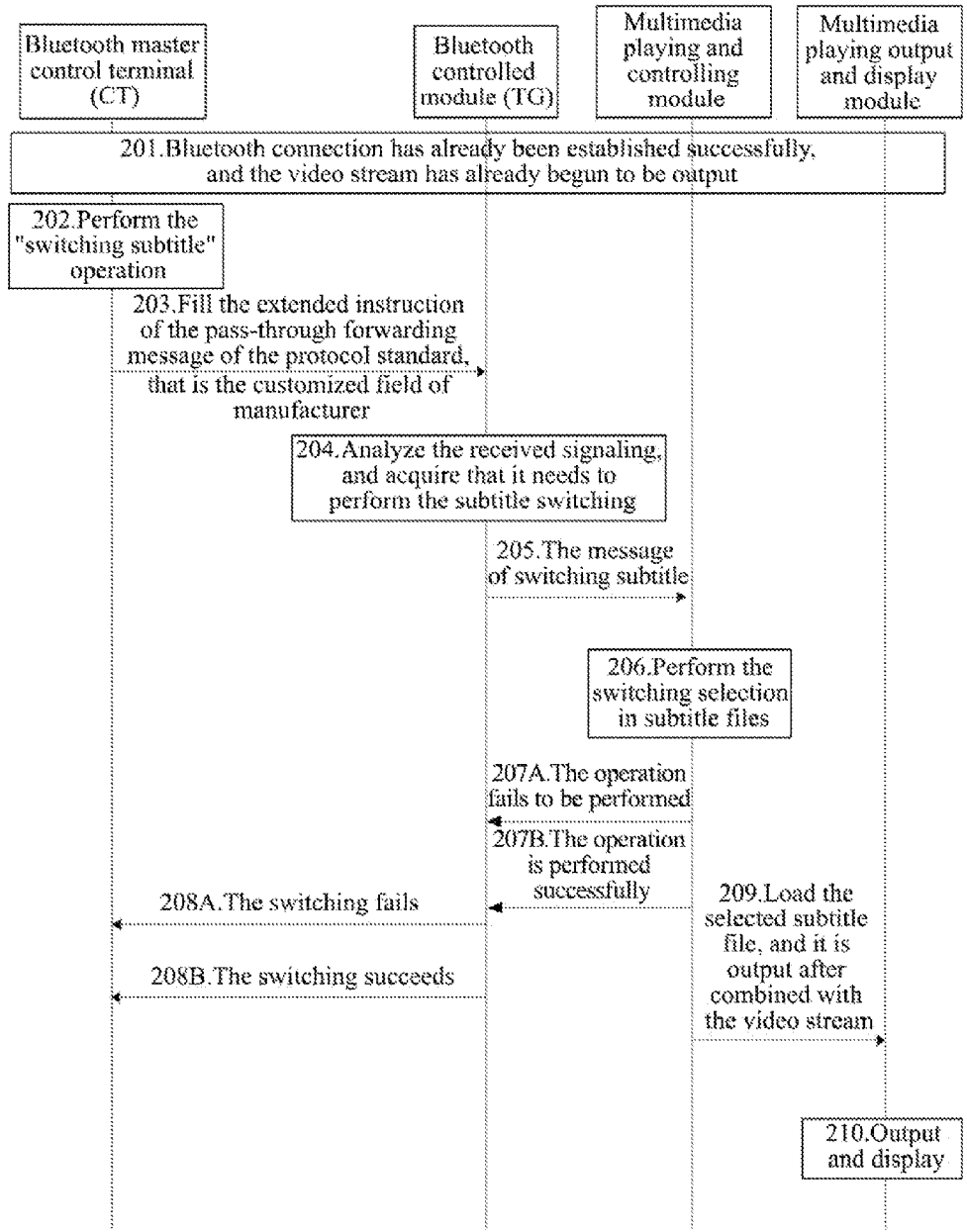
FIG. 2 is a flow chart of process according to a method embodiment of the present invention.

The present embodiment provides a method for controlling multimedia playing through Bluetooth, which makes it possible to remotely control the Bluetooth video playing device through the Bluetooth control device. The method for controlling switching and loading the subtitle is shown in FIG. 2, and the method includes the following steps:

in step 201: as a precondition, a Bluetooth connection between the Bluetooth control device A and the Bluetooth multimedia playing device B has already been established successfully, and the video stream has already begun to be played;

in step 202: the user operates on the Bluetooth control device A, and performs the "switching subtitle" operation;

in step 203: the Bluetooth control module (CT) of the device A sends the extended instruction of the pass-through forwarding message (PASS THROUGH) based on the protocol standard through the Bluetooth AVRCP Profile, that is customized field of the manufacturer (Vendor Unique). The action filled in the extended instruction is defined as switching subtitle (SwitchSub), and a reserved field therein is set as switching subtitle, for example, it can set the field Vendor_Unique_id as a preset value to indicate performing the subtitle switching. That preset value can be but not limited to 0x03, as long as that the value is appointed through the protocol to indicate the switching subtitle instruction, and when the multimedia playing device reads that field, it can acquire that that field indicates the switching subtitle instruction and perform the subtitle switching; the filling format of that extended instruction is shown in Table 1;

TABLE 1 the filling format of the instruction PASS THROUGH

| Oct | MSB (7) | 6 | 5 | 4 | 3 | 2 | 1 | LSB (0) |
|---|---|---|---|---|---|---|---|---|
| 0 | 0x0 | | | | Ctype: 0x0 (CONTROL) | | | |
| 1 | Subunit_type: 0x9 (PANEL) | | | | Subunit_ID: 0x0 | | | |
| 2 | Opcode: 0x7C (PASS THROUGH) | | | | | | | |
| 3 | State_flag* | | | Operation_ID: 0x7E (VENDOR UNIQUE) | | | | |
| 4 | Operation_data_field_length: 0x5 | | | | | | | |
| 5-7 | Company ID: BT SIG registered CompanyID | | | | | | | |
| 8-9 | Vendor_unique_id: 0x03 | | | | | | | | in step 204: the Bluetooth controlled module (TG) of the device B receives the SwitchSub signaling from the device A, and it analyzes the SwitchSub signaling and acquires that it needs to perform the subtitle switching according to the value of the field Vendor_Unique_id therein;

in step 205: TG transmits the message of switching subtitle to the multimedia playing and controlling module of the device B, or it calls the API function of the corresponding multimedia playing and controlling module which is called directly by the TG module;

in step 206: the multimedia playing and controlling module of the device B performs the subtitle switching operation, like the user directly performs "switching subtitle" operation on the media player, which selects in a plurality of subtitle files and performs the cycle switching and loading between the subtitle files;

in step 207A: the multimedia playing and controlling module fails to perform the SwitchSub operation, and the message of performing operation failure is returned to the TG;

in step 207B: the multimedia playing and controlling module performs the SwitchSub operation successfully, and the message of performing operation success is returned to the TG;

in step 208A: the TG, after receiving the message of performing operation failure, transmits the extended instruction VendorUniqueResponse of the PASS THROUGH based on the protocol standard to the device A, and the filling format of the extended instruction is shown in Table 2, wherein, the Response field is filled as 0xA (REJECTED, that is, the switching fails), and the whole procedure ends;

TABLE 2 the filling format of the instruction VendorUniqueResponse

| Oct | MSB (7) | 6 | 5 | 4 | 3 | 2 | 1 | LSB (0) |
|---|---|---|---|---|---|---|---|---|
| 0 | 0x0 | | | | | | Response* | |
| 1 | Subunit_type: 0x9 (PANEL) | | | | Subunit_ID: 0x0 | | | |
| 2 | Opcode: 0x7C (PASS THROUGH) | | | | | | | |
| 3 | State_flag** | | Operation_ID: 0x7E (VENDOR UNIQUE) | | | | | |
| 4 | Operation_data_field_length: 0x5 | | | | | | | |
| 5-7 | Company ID: BT SIG registered CompanyID | | | | | | | |
| 8-9 | Vendor_unique_id: 0x03 | | | | | | | | in step 208B: the TG, after receiving the message of performing operation success, transmits the extended instruction VendorUniqueResponse of the PASS THROUGH based on the protocol standard to the device A, and the filling format of the extended instruction is shown in the above Table 2, wherein, the Response field is filled as 0x9 (ACCEPTED, that is, the switching is successful), and the step 209 is executed;

in step 209: the multimedia playing and controlling module loads the subtitle file which is obtained through switching, and sends to the multimedia playing output and display module after combined with the video stream;

in step 210: the multimedia playing output and display module plays the received video stream.

The above description is only the preferred embodiments of the present invention and is not intended to limit the present invention. For those skilled in the art, the present invention can have various modifications and variations. All of modifications, equivalents, variations and so on without departing from the spirit and essence of the present invention should be included in the scope of the appended claims of the present invention.

INDUSTRIAL APPLICABILITY

The present invention provides a system and method for controlling subtitle switching through Bluetooth, which can realize wirelessly and remotely controlling a multimedia player through Bluetooth to load the subtitle files freely and switch between a plurality of subtitle files when playing a multimedia video file.

What is claimed is:

1. A method for controlling multimedia playing through Bluetooth, comprising:

a Bluetooth control device transmitting a media control instruction which instructs a Bluetooth multimedia playing device to perform subtitle switching to the Bluetooth multimedia playing device after a Bluetooth connection is established between the Bluetooth control device and the Bluetooth multimedia playing device; and the Bluetooth multimedia playing device performing the subtitle switching after receiving the media control instruction, and after switching successfully, loading a subtitle file which is obtained through switching, and playing after combined with a video stream;

wherein, the step of the Bluetooth control device transmitting the media control instruction which instructs the Bluetooth multimedia playing device to perform the subtitle switching to the Bluetooth multimedia playing device comprises: setting a value to a reserved field Vendor_unique_id of an Audio Video Remote Control Profile (AVRCP) pass-through forwarding message for indicating switching subtitle when the Bluetooth control device transmits the pass-through forwarding message to the Bluetooth multimedia playing device.

2. The method according to claim 1, wherein, after the step of the Bluetooth multimedia playing device performing the subtitle switching, the method further comprises: if switching succeeds, transmitting a message of switching success to the Bluetooth control device, and if switching fails, transmitting a message of switching failure to the Bluetooth control device.

3. A system for controlling multimedia playing through Bluetooth, comprising a Bluetooth control device and a Bluetooth multimedia playing device, wherein, the Bluetooth control device comprises a Bluetooth control module, which is configured to: transmit a media control instruction which instructs the Bluetooth multimedia playing device to perform subtitle switching to the Bluetooth multimedia playing device after a Bluetooth connection is established between the Bluetooth control device and the Bluetooth multimedia playing device;

the Bluetooth multimedia playing device comprises a Bluetooth controlled module, a multimedia playing and controlling module and a multimedia playing output and display module;

the Bluetooth controlled module is configured to: control the multimedia playing and controlling module to perform the subtitle switching after receiving the media control instruction;

the multimedia playing and controlling module is configured to: perform the subtitle switching and load a switched subtitle file and transmit to the multimedia playing output and display module after combined with a video stream; and the multimedia output and display module is configured to: play a received video stream;

wherein, the Bluetooth control module is configured to transmit the media control instruction which instructs the Bluetooth multimedia playing device to perform the subtitle switching to the Bluetooth multimedia playing device through a following way: setting a value to a reserved field Vendor_unique_id of an Audio Video Remote Control Profile (AVRCP) pass-through forwarding message for indicating switching subtitle when transmitting the pass-through forwarding message to the Bluetooth multimedia playing device.

4. The system according to claim 3, wherein,
the Bluetooth controlled module is further configured to: perform analyzing after receiving the pass-through forwarding message, and acquire that the subtitle switching needs to be performed according to the value of the reserved field.

5. The system according to claim 3, wherein,
the Bluetooth controlled module is configured to control the multimedia playing and controlling module to perform the subtitle switching by a following way: transmitting a message of switching subtitle to the multimedia playing and controlling module or performing the subtitle switching by directly calling an application programming interface function of the multimedia playing and controlling module.

6. The system according to claim 3, wherein,
the multimedia playing and controlling module is further configured to: transmit a message of operation success to the Bluetooth control device after an switching subtitle operation is successful; and transmit a message of operation failure to the Bluetooth control device after the switching subtitle operation fails.

7. A Bluetooth control device, comprising a Bluetooth control module, which is configured to: transmit a media control instruction which instructs a Bluetooth multimedia playing device to perform subtitle switching to the Bluetooth multimedia playing device after a Bluetooth connection is established between the Bluetooth control device and the Bluetooth multimedia playing device;
wherein, the Bluetooth control module is configured to transmit the media control instruction which instructs the Bluetooth multimedia playing device to perform the subtitle switching to the Bluetooth multimedia playing device through a following way: setting a value to a reserved field Vendor_unique_id of an Audio Video Remote Control Profile (AVRCP) pass-through forwarding message for indicating switching subtitle when transmitting the pass-through forwarding message to the Bluetooth multimedia playing device.

* * * * *